March 24, 1942.   C. E. VAN STONE ET AL   2,277,188
PORTABLE PIPE STRAIGHTENER
Filed Aug. 12, 1939   2 Sheets-Sheet 2
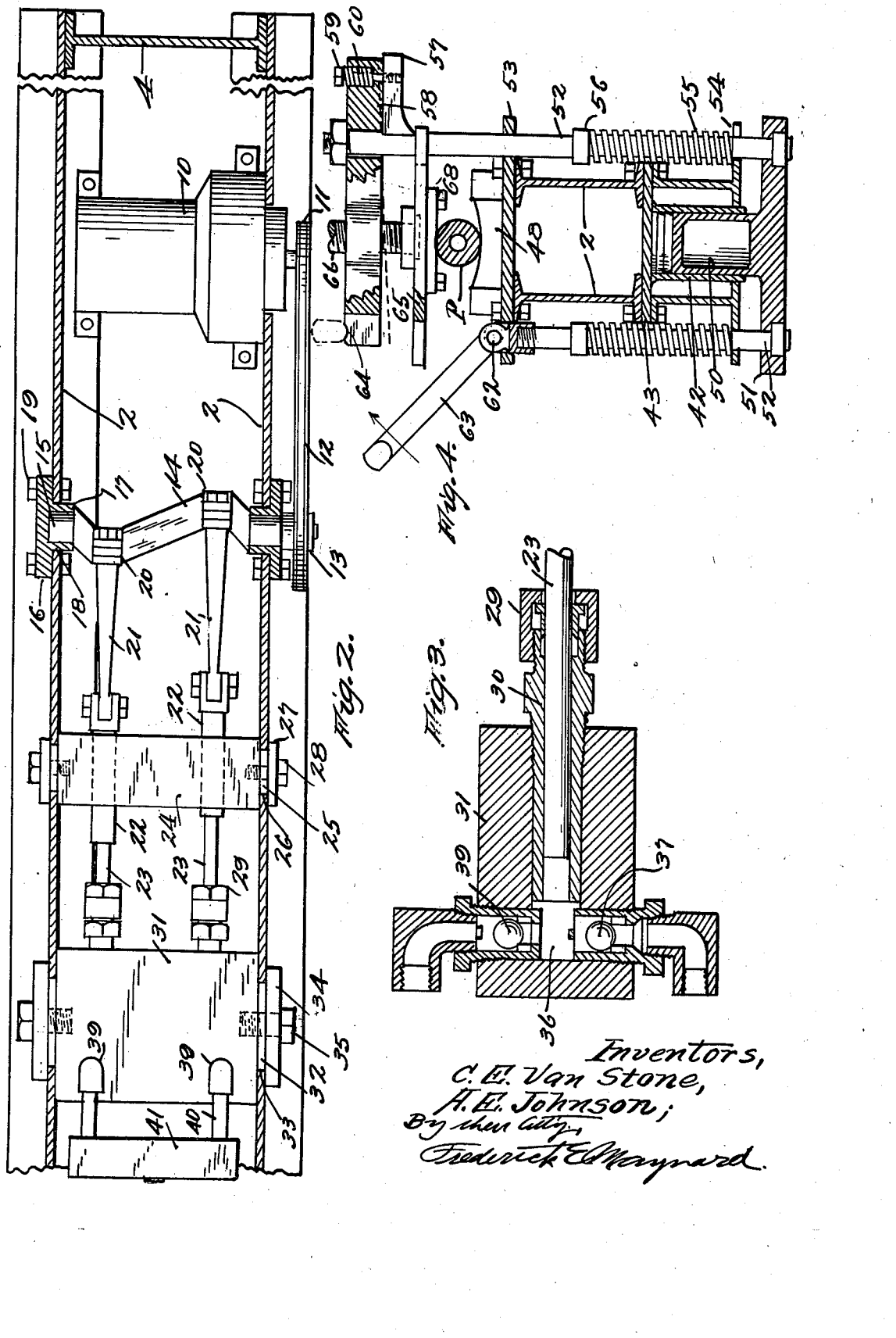
Inventors,
C. E. Van Stone,
A. E. Johnson;
By their Atty,
Frederick E. Maynard.

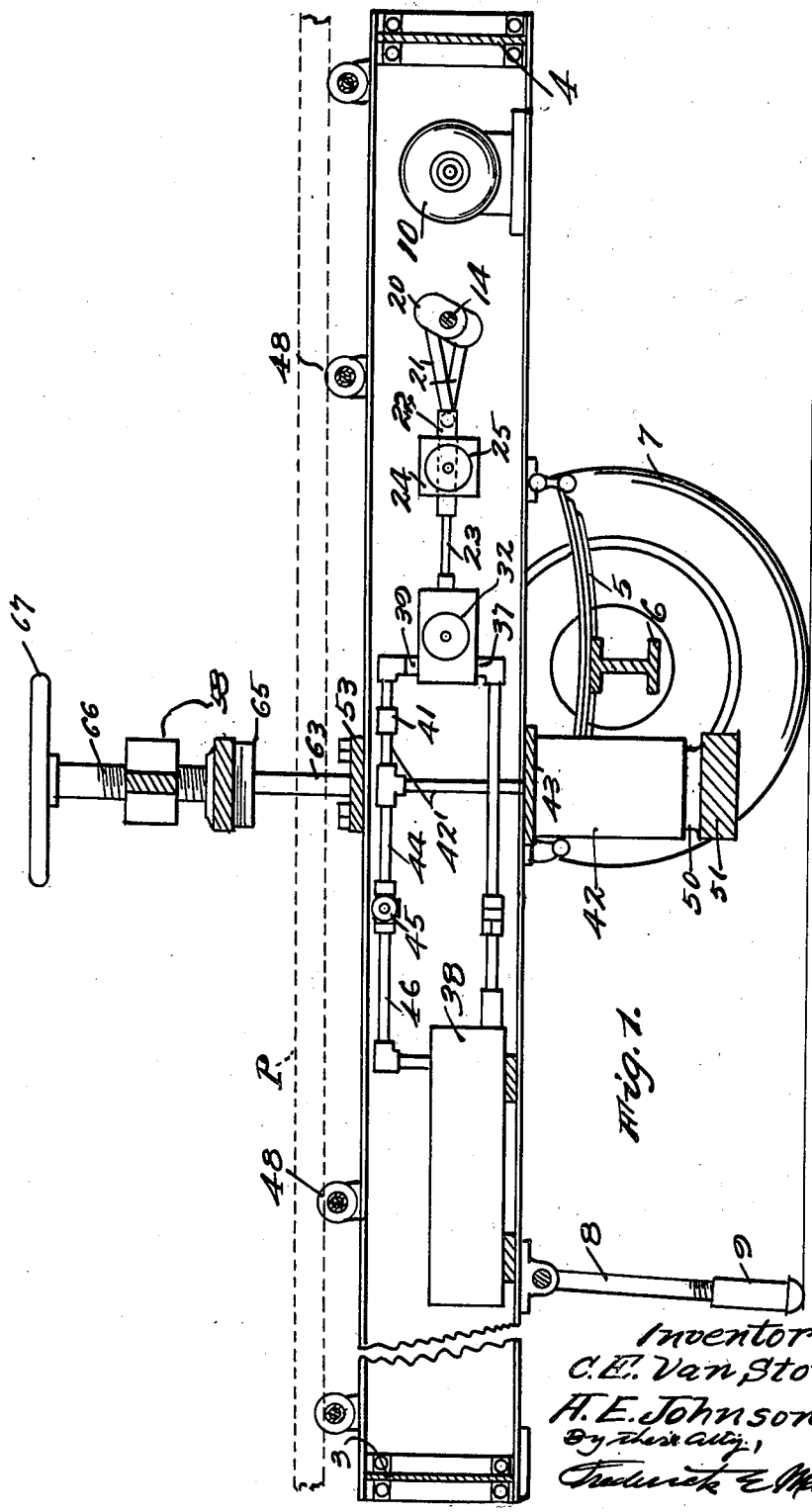

Patented Mar. 24, 1942

2,277,188

UNITED STATES PATENT OFFICE 2,277,188

PORTABLE PIPE STRAIGHTENER

Clifford E. Van Stone and Arthur E. Johnson, Taft, Calif., assignors to Shaffer Tool Works, Brea, Calif., a corporation of California Application August 12, 1939, Serial No. 289,820

3 Claims. (Cl. 153—48)

This invention is a pipe or rod straightener, and more particularly a portable, wheeled vehicle pipe straightener, of a type for heavy duty.

In the oilfield industry a large amount of long rods, pipes and drill stems are employed and because of the great strains and loads placed on such apparatus the pieces become bent out of line.

It is an object of this invention to provide a substantial, powerful, easily operated and readily transported vehicle including a prime motor and a hydraulic press unit to effect the straightening of the bent members in the immediate vicinity of a well site, or field plant so as to avoid the necessity of hauling the defective members to a remote plant or repair shop.

Another object is to provide a highly compact, semi-trailer vehicle capable of readily being hauled over frequently difficult roads and roadless fields into the immediate site of wells or such other services as may be in need of employment of tools of this type. It is an object to provide such a semi-trailer, having traction wheels aft of its center of gravity, with means to support or prop its forward end when this is unhitched from its hauling and pilot tractor or other leading and pulling vehicle. In this connection it is an object to provide for the use of the power unit of the straightener to primarily support the fore end of the vehicle until a leg prop can be manually adjusted.

A purpose is to provide for the quick setting of a pipe or rod in place on bed rollers beneath a presser head, and for its ready removal.

The invention consists of certain improvements in this art as set forth in the ensuing disclosure and having, with the above additional objects and advantages as hereinafter developed, and whose constructions, combinations and details of means, and the manner of operation will be made manifest in the description of the herewith illustrative embodiment; it being understood that modifications, variations and adaptations may be resorted to within the spirit, scope and principle of the invention as it is more directly claimed hereinbelow.

Figure 1 is a central, longitudinal section, vertically, of the machine as propped and ready for use.

Figure 2 is a longitudinally broken, longitudinal transverse section of frame showing the hydraulic power assembly in plan.

Figure 3 is a sectional detail of the hydraulic pump assembly.

Figure 4 is a vertical, central section of the press unit.

In a machine of this class and for very heavy duty on thick-walled, steel drill pipe and other heavy rod like members it is essential that great rigidity and true alinement of the operative mechanisms and their several elements be maintained to avoid undue frictional resistances in functioning.

To that end the machine here includes a pair of side frame elements preferably in the form of deep web I-beams 2—2 having like, end transverse girders 3 and 4. Somewhat toward the rear end of this frame it is supported on heavy side springs 5 suitably mounted on a transverse axle 6 having large tired road wheels 7. The front end of the frame is adapted to be hitched to any suitable or convenient tractor in semi-trailer fashion to impart a portion of its front end load thereon. This front end is provided with a folding prop leg 8, having a threaded foot 9, which is lowered into vertical position as shown for front end support of the machine independently of the pilot tractor (not shown).

On the rear portion of the frame 2—2 there is provided a suitable prime motor of any desired type and here shown as an electric motor 10 (of reduction geared type) which drives a sprocket pinion 11 of a chain 12 to a relative wheel 13 to comprise a transmission for rotation of a hydraulic pump shaft 14. To carry out the desired rigidity feature of the machine the shaft 14 has end trunnions 15 journalled in substantial bearing blocks 16 which in turn have heavy bushing parts 17 snugly fitting and centered in holes 18 carefully on a transverse axis in the frame 2—2 for true center support of the shaft ends 15. The bearing blocks 16 are secured by suitable bolts 19.

The shaft 14 has spaced, diametrically opposite cranks 20 each having a connecting rod 21 pivoted to respective shanks 22 of parallel pump pistons 23 reciprocative in a heavy stationary cross-block 24. For rigidity and fixed alinement the ends of this block 24 have trunnions 25 tight fitting and centered in alined holes 26 in the opposite sides of the frame 2. The end trunnions 25 have end plates 27 overlapping on the frame sides and bolted at 28.

The pump pistons 23 pass into suitable packing glands 29 which are threaded onto the near ends of elongate cylinder sleeves 30 which are threaded into a massive pump block 31. The ends of this block have elongate trunnions 32 close fitted and carefully centered in holes on a transverse axis, as shown at 33; these trunnions having end caps 34 lapping the outer faces of the frame 2 and fastened by bolts 35. By this trunnion system of mounting the crank shaft 14, the cross-block 24 and the pump block 31 transverse and longitudinal rigidity of all bearing parts for the movable elements is assured and maintained, and correct replacement can be readily effected when needed.

The pump block has a transverse pressure chamber 36 to which the cylinder sleeves 30 open and the lower side or bottom of the block 31 has inlet check valves 37 for eduction of liquid from a connected supply tank 38. Outlet, check valves 39 have connection by pipes 40 to a common manifold 41 having a feeder pipe 42' to the head of a hydraulic press cylinder 42 fixed to end below a transverse tie plate 43, Fig. 4. From the manifold 41 also extends a discharge pipe 44 having a stop cock 45, which, when closed diverts the pumped liquid to the press cylinder 42, and when open leads to a tank return pipe 46.

This power and hydraulic mechanism affords a means for the ready and effective operation of a suitable presser head assembly whereby to straighten a bent pipe P (dotted lines, Fig. 1), laid on longitudinally spaced, parallel transverse bed forming rollers 48 journalled on the top of the frame 2—2 at suitable points therealong.

The press cylinder 42 is open at the bottom to telescopically receive a press plunger or piston 50 fixed on a cross-foot 51 having vertical end posts 52 fixed on its ends and extending upward outside of the main frame 2 and working freely through suitable holes in a top cross guide plate 53 fixed on the frame. The lower ends of the press posts 52 work through side brackets 54 which embrace and fasten to the pendent cylinder 42 of the press.

Means in the form of ample springs 55 engage collars 56 on the posts 52 operate to normally press the press piston 50 upwardly but are overcome by fluid pressure in the cylinder 42 to move the piston and related parts downwardly on work stroke.

One post 52 extends rigidly, continuously well upward and has a laterally directed shoulder 57 and on this there rests a horizontally swingable, cross-head 58 having a slight vertical tilting capacity on the upper end of its post 52, which might be called the head, swivel post. Mounted in the shoulder 57 is an anchor pin 59 playfully passing through the near end of the head 58 and surrounded by a push down spring 60 acting on the head to hold its near end seated on the shoulder but allowing the far or opposite end of the arm or head 58 to be yieldably depressed as for a purpose now to be described.

In order to facilitate the entry of a pipe or other member to be worked on onto the roller bed one of the press posts 52 is constructed and arranged to manipulate out of the way of the pipe being put on or removed from the press so that the pipe will not have to be shifted endwise for the length thereof or of the machine. To that end, one post is provided with a pivot joint 62 joining to the lower end of the shank of a T-head member 63 which is adapted to be tilted upwardly from the open position shown in Fig. 4 so that the head of the T will take over the near end of the swivelled, press, cross-head 58 and will interlock in a seat 64 in the top of the head 58; the spring 60 allowing the T head to press over into position in the seat, and to be pulled out therefrom when the press is to be opened. When the cross-head 58 is free from the locking T-shank 63 the head may be rotated, with its post 52, so that a pipe P may be lowered by a crane onto and raised from the bed of the machine; the post 52 meanwhile turning on a member such as one of the press springs 55.

Slidably mounted on the swivel post 52 is an adjustable presser plate 65 in which is stepped and swivelled a head screw 66 threaded in the cross-head 58 and having a hand wheel 67 fixed on its upper end. By this adjustable presser plate and head device a considerable range of size adjustment is available aside from the range or stroke of the hydraulic plunger. Also it affords a means which may be closed down on a pipe to grip it while the press plunger is at its innermost or collapsed position in readiness for work stroke. An anti-slip block or work shoe 68 is affixed to the presser head plate 65. It is understood that the presser head 65 swings unitedly with the cross-head 58.

When the machine is to be detached from a given hauling tractor, or other agent, the press is operated so as to lower the cross-foot 51 to engage the ground or some other firm support and thus form a bolster for the front end of the frame as it is unhitched from the tractor, and until the front prop leg 8 is dropped and adjusted and set under the frame. It will be seen that the hydraulic press may be used to powerfully jack up the load of the front end of the semi-trailer to aid in unhitching, and vice versa.

In places of use of the tool where there is no crane, and that is frequent, a great advantage of the side opening for loading and unloading the pipe is that a simple skid of side bars can be rigged up from the machine here disclosed to the floor or platform on which the pipe or rods are racked, and the pipe or rods can be easily rolled to or from the machine.

What is claimed is:

1. A straightening machine including a frame having spaced side walls, and a press assembly including a pressure chamber block, a piston rod guide block, and a crank shaft each having end trunnion supports rigidly set into and secured to the frame walls whereby to secure rigidity and correct alinement of assembly.

2. A rod, stem or pipe straightening machine including a box frame having a wheeled axle, a press pump assembly including a motor, a piston block, a crank shaft having piston connections to pistons in the block all arranged on the frame in a longitudinal line normal to the axle-axis vertical plane and to one side of the axle and each having end journals on a common plane along said line and from side to side of the frame, and a press on the frame at the other side of the shaft; whereby to effect an approximate balance of load on the axle to facilitate trailing roadability of the machine.

3. The combination, in a press of the class described, of a frame having parallel side webs, and a press assembly including a pressure chamber unit, a crank shaft unit, and a piston rod guide unit (for rods connecting the shaft and pistons in the chamber unit) disposed between the said shaft and the chamber unit, and trunnion supports secured to the webs and being in a common plane along and across the frame and on which supports said assembly units are mounted at their ends to secure rigidity and alinement.

CLIFFORD E. VAN STONE.
ARTHUR E. JOHNSON.